B. F. JOSLYN.
REVOLVING FIRE-ARMS.
No. 180,037. Patented July 18, 1876.
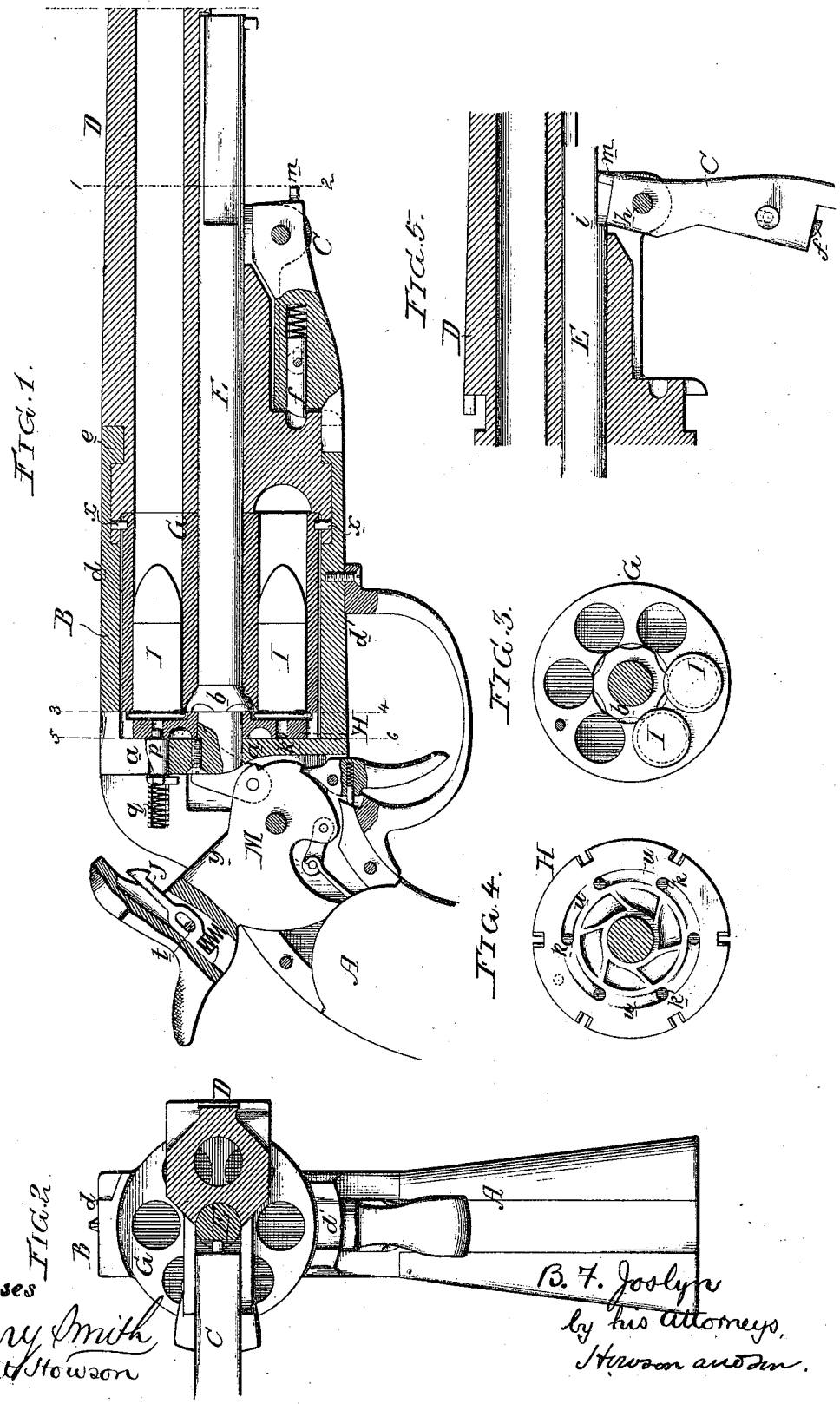

UNITED STATES PATENT OFFICE.

BENJAMIN F. JOSLYN, OF WORCESTER, MASSACHUSETTS, ASSIGNOR TO RICHARD P. BRUFF, OF NEW YORK CITY.

IMPROVEMENT IN REVOLVING FIRE-ARMS.

Specification forming part of Letters Patent No. 180,037, dated July 18, 1876; application filed September 17, 1875.

*To all whom it may concern:*

Be it known that I, BENJAMIN F. JOSLYN, of Worcester, Worcester county, Massachusetts, have invented certain Improvements in Revolving Fire-Arms, of which the following is a specification:

The objects of my invention are, first, to lock the barrel to, and unlock it from, the frame of a revolver by the same lever which is employed to start the cartridges from the cylinder; and, second, to permit the cartridges to be started from the cylinder or not, as may be desired.

These objects I attain in the manner which I will now proceed to describe, reference being had to the accompanying drawing, in which—

Figure 1 is a longitudinal section of my improved revolver; Fig. 2, a transverse section on the line 1 2; Fig. 3, a view of the cylinder on the line 3 4; Fig. 4, a view of the plate at the rear of the cylinder, and Fig. 5 a part of Fig. 2.

A is the stock, B the frame, and D the barrel, of the revolver, E being the breech-pin, secured at its inner end to the breech *a* of the frame, and between this breech and a collar, *b*, on the breech-pin intervenes the breech-plate H, referred to hereafter.

It will be seen, on reference to Fig. 3, that on the edge of this collar are formed a series of recesses corresponding to the bores in the cylinder, and these recesses are such that when they are brought to coincide with the said bores they will not interfere with the heads of the cartridges; but when the said recesses are out of line with the bores the projections formed on the collar *b* by these recesses will bear on the heads of the cartridge, and arrest their outward progress with the cylinder, as described hereafter.

The two arms *d* and *d'* of the frame are connected to the rear of the barrel in the manner best observed in Figs. 1 and 5, the said arms having projections *e*, so formed, and so adapted to recesses in the barrel, that the latter can be turned on the center-pin to the position shown in Fig. 2 when it is released from the frame. The barrel, however, cannot be thus released from the frame without first operating the spring-bolt *f*, contained within the lever C, which is hung to projections on the under side of the barrel, and so adapted to notches in both barrel and frame that it locks them together until moved, as shown in Fig. 5.

The lever C serves to perform another duty, namely, that of starting the spent metallic cartridges from the bore of the cylinder, the latter being retained on the barrel by pins *x x*, adapted to a groove made in the cylinder, as shown in Fig. 1.

After the barrel has been turned to the position shown in Fig. 2, the lever C is moved to the position shown in Fig. 5; and during this movement the short arm *h* of the lever comes in contact with a notch, *i*, in the breech-pin, and causes the barrel and cylinder to move outward from the frame; but as the heads of the cartridges bear against the projections on the collar *b* of the breech-pin, they must be left behind when the barrel and cylinder are thus moved forward.

It should be understood that the cartridges are simply started from the bores of the cylinder by the lever H, the movement of which is limited by a pin, *m*; but after being thus started the cartridges can be readily removed with the finger and thumb.

When it is desired to move the barrel outward without starting the cartridges, the cylinder is so adjusted that the recesses on the collar *b* will coincide with the bores in the cylinder, and consequently not interfere with the movement of the cartridges.

It will be evident, also, that, in loading, these recesses on the collar permit the cartridges to be inserted directly into the bores of the cylinder, instead of being placed in the recesses in the plate for extracting the cartridges, as usual, for the recesses on the collar *b* permit the passage of the heads of the cartridges to the rear of the collar, when the cylinder is returned to its normal position.

In the breech *a* is a sliding pin, *p*, acted on by a spring, *q*, a projection on the pin being adapted to orifices *k* in the breech-plate H, the latter being so connected, through the medium of steady-pins to the cylinder, that the latter cannot turn independently of the plate.

In an opening in the hammer is a spring-catch lever, J, loosely pivoted to a pin, $t$, a spring acting on the short arm of the lever, and tending to depress the long arm, the end of which is arranged to catch over the head of the pin $p$, so that on drawing back the hammer the said pin will be moved rearward to a sufficient extent for its projection to be clear of the breech-plate before the cylinder begins to turn. After the cylinder has been turned a short distance, however, the pin $p$ is released, and its projection enters one of the inclined recesses or guides $w$ in the face of the breech-plate, by which guide the projection on the pin will be directed to that orifice in the breech-plate next to that from which it had been withdrawn by the hammer.

I prefer to make the lever J with a slot for receiving the pivot-pin, as shown.

As shown in Fig. 1, the revolver is arranged for the discharge of ordinary metallic cartridges, the heads of which are struck by the point of the hammer. When the revolver has to be used for center-firing, however, the pin $p$ is removed to make way for a pin of like character in every respect, excepting that it has a longer projection for striking the center of the cartridge. In this case the front edge $y$ of the hammer, when the latter falls, strikes the pin $p$ and causes its projections to penetrate the center of the cartridge.

I claim as my invention—

The combination of the movable barrel D, adapted to be locked and released from the frame B by being turned on the stationary breech-pin, with the lever C, for starting the cartridges, and adapted to notches in both barrel and frame, as set forth.

In testimony whereof I have signed my name to this specification in the presence of two subscribing witnesses.

BENJAMIN F. JOSLYN.

Witnesses:
S. B. I. GODDARD,
CHARLES V. PUTNAM.